Nov. 1, 1955     J. R. VAN BUREN     2,722,345
COFFEE DISPENSER
Filed Feb. 23, 1954

INVENTOR.
James R. Van Buren
BY
J. O. St. Palley
Patent Agent

United States Patent Office 2,722,345
Patented Nov. 1, 1955

2,722,345

COFFEE DISPENSER

James R. Van Buren, New Haven, Conn.

Application February 23, 1954, Serial No. 411,977

4 Claims. (Cl. 222—193)

My invention relates to a dispensing device for granular materials, and has particular utility for dispensing instant coffee in variable predetermined quantities.

One of the objects of my invention is to provide a device which will dispense instant coffee, or other similar granular material in predetermined measured quantities conveniently by the axial movement of a single operating element.

Another object of my invention is to provide a dispensing device in which the quantity of the material discharged can be regulated conveniently and accurately by the turning of the same single operating element.

Another object of my invention is to provide a coffee dispenser in which the light and flaky coffee granules, which tend to adhere to surfaces and to coalesce under pressure, are gently and effectively accelerated by means of a properly applied air current.

A further object of my invention is to provide a coffee dispenser which in the normal or non-dispensing position will effectively seal the coffee from the infiltration of the moist atmospheric air, which would cause its early deterioration.

Other objects and advantages of my invention will be apparent during the course of the following description.

Figure 1:
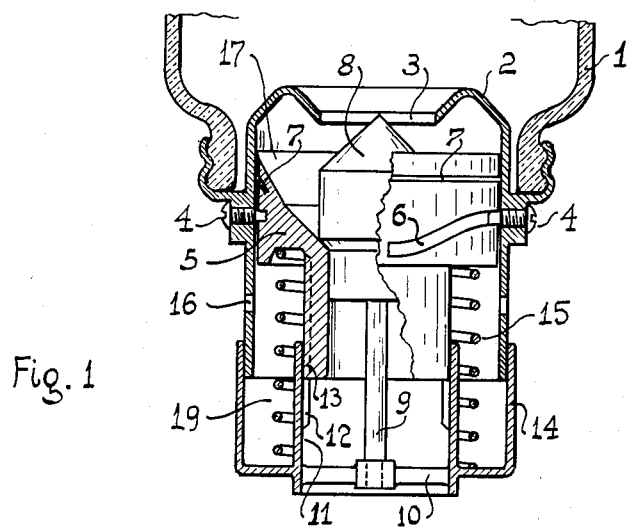
Figure 2:
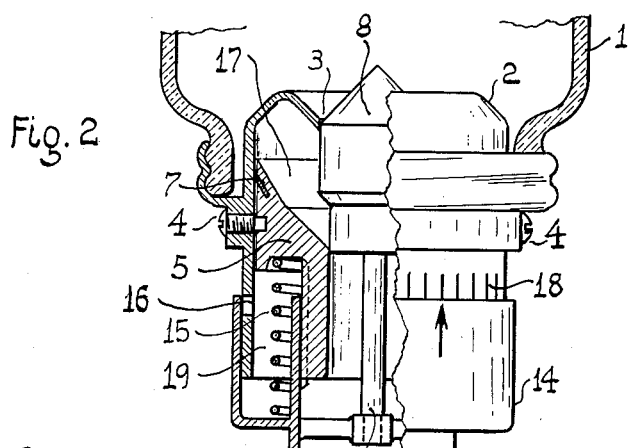
Figure 3:
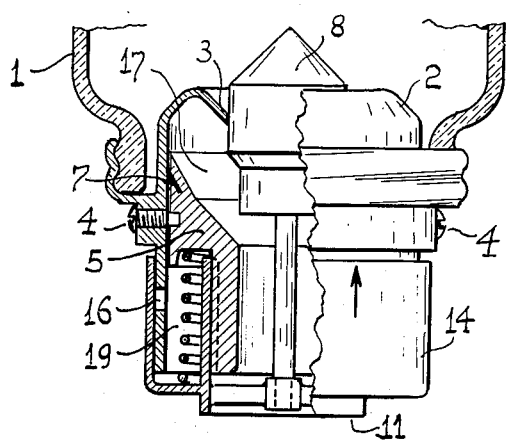

In the accompanying drawing, forming a part of this application, wherein, for the purpose of illustration, is shown a preferred form of my invention, Figure 1 is a sectional view of my dispensing device, showing the parts in the normal or non-dispensing position, Figure 2 is a partially sectional view of the same, showing the parts in the intermediate position, Figure 3 is a similar sectional view showing the parts in the dispensing position.

In the drawing, wherein like numerals are employed to designate like parts, the numeral 1 designates the coffee-container, shown in an inverted position, which may be of glass or other suitable material, and may be portable or with a stationary support. Secured to said container 1 is the tubular body portion 2, having a dome-shaped upper end with a circular opening 3. In the form of my invention illustrated in the drawing, said body portion 2 is secured to said container 1 by means of an external screw connection adapted to a jar-type container with a peripherally threaded neck. It is, however, within the spirit of my invention to secure said body portion to said container by other methods known in the art.

Secured to said body portion 2 at diametrically opposite points are two studs 4. Mounted within said body portion is the funnel 5, which is provided with two similar spiral grooves 6 disposed at 180 degrees apart, and engaging said studs 4 of the body portion, as a result of which, the rotation of said funnel in said body portion will cause the axial advance of said funnel relative to said body portion.

An important element of said funnel 5 is a resilient gasket 7, which is so designed that it will effectively prevent the passage of air in the downward direction. Due to its resiliency, said gasket will also act as a seal against the upward passage of air at the slight pressures encountered in the normal or non-dispensing position of the device. In the dispensing position, however, the higher air-pressure produced under the funnel will flex the gasket 7 away from the inner wall of the body portion 2 so as to permit the upward passage of the air.

Slidably mounted within said funnel 5 is the plunger 8 which has a conical top and an upper cylindrical portion of the same diameter as the opening 3 of the body portion 2, also a conical seat and a lower cylindrical portion closely fitting the outlet opening of the funnel 5.

Coaxially secured to said plunger 8 is the connecting rod 9, the lower end of which is attached to the sleeve 11 by means of radial spokes 10. Said sleeve 11 is slidably mounted over the lower, cylindrical part of the funnel 5, and being provided with keys 12 sliding in the key-ways 13 of the funnel 5, for the purpose of insuring the simultaneous rotation of said funnel and sleeve.

Slidably mounted over the lower part of the body portion 2 is the cap 14, the lower end of which is secured to the sleeve 11, as a result of which, the upward sliding of said cap 14 will raise the sleeve 11 and the connected plunger 8, and the turning of said cap will turn the funnel 5 within said body portion.

Interposed between said cap 14 and the horizontal base of said funnel 5 is a helical spring 15 the function of which is to return the plunger 8 into the normal or non-dispensing position, also to press the plunger against the funnel in said position in order to obtain an air-tight seal.

The body portion 2 is provided with air-holes 16 near its lower edge, which are so located that in the normal position (see Fig. 1) they permit the passage of air, but they are covered by the cap 14 after the intermediate position is passed. (See Figs. 2 and 3.)

The above described arrangement of the parts composing my invention has the following notable features.

One of these important features is the finely and conveniently adjustable measuring cavity 17, formed in the upper part of the body portion 2 by the funnel 5 and the plunger 8. This cavity is filled by gravity with the coffee granules when the container 1 is brought into the inverted position shown in Fig. 1 and the capacity of the cavity is determined by the distance between the opening 3 and the funnel 5. By turning the cap 14, together with the funnel 5, the axial position of said funnel, in relation to the opening 3, can be finely regulated, and thereby the amount of the material discharged in the dispensing position can be accurately predetermined. The scale 18, shown in Figs. 2 and 3, serves to indicate the dispensing capacity for which the device is set.

The other important feature of my device is the air-chamber 19, formed by the lower part of the body portion 2, the lower, cylindrical part of the funnel 5, also by the sleeve 11 and the cap 14, which, when compressed against the spring pressure, acts as an air-pump, forcing air through the gap between the wall of the body portion 2 and the funnel 5, and by-passing the gasket 7, into the cavity 17, and thereby accelerating the discharge of the coffee granules from the cavity.

The operation of my device will be as follows:

In order to regulate the quantity of the coffee to be dispensed according to the individual taste the cap 14 is rotated until its position corresponds to the required grade on the scale 18. Then, the container is brought into the inverted position, shown in Fig. 1, causing the coffee granules to flow into the cavity 17. Following this, the cap 14 is moved upward against the pressure of the spring 15, causing the upward movement of the plunger 8 and also the contraction of the air-chamber 19. When this upward movement of the cap 14 reaches the intermediate position, shown in Fig. 2 of the drawing, the plunger 8 will close the opening 3, and the upper edge of the cap 14 will cover the air hole 16. Continuing this upward movement of the cap, the lower cylindrical part of the plunger 8 will leave the central outlet opening of the funnel 5, permitting the discharge of the coffee granules from the cavity 17. Simultaneously, the pump action of the air-chamber 19, air-hole 16 being closed, will force air into the cavity 17, and thereby will accelerate the discharge of the granules. This action will continue until the position shown in Fig. 3 is reached. After the discharge of the coffee granules is completed the cap 14 and the connected parts will return, due to the action of the spring 15, into the normal position shown in Fig. 1 of the drawing.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

I claim:

1. In combination with a container for instant coffee; a tubular body portion, secured to said container, and having at one end an intake opening communicating with said container, said body portion being provided with internal studs; a funnel, movably mounted within said body portion with an air-passing clearance, and having spiral grooves engaging said studs thereby obtaining axial advance when rotated, defining a measuring cavity of adjustable volume, said funnel being provided with an outlet opening co-axial with said intake opening; a resilient gasket mounted on said funnel, and adapted to admit air into said cavity when forced by a predetermined pressure; a plunger, axially slidable into normal, intermediate, and dispensing positions, and being adapted to open said intake opening and close said outlet opening when in the normal position, to close both said openings when in the intermediate position, and to close said intake opening and open said outlet opening when passing from the intermediate to the dispensing position; a slidable and rotatable sleeve, being secured to said plunger for simultaneous sliding and being slidably keyed to said funnel for simultaneous rotation; a cap, secured to said sleeve, and being slidable over said body portion, defining an air-chamber of variable volume, said air-chamber being adapted to produce a predetermined air-pressure necessary to force air into said cavity, against said resilient gasket, when said plunger and the connected parts are passing from the intermediate to the dispensing position; a spring adapted to return said plunger, sleeve, and cap into the normal position.

2. A dispenser for granular material, comprising; a container; a tubular body portion, secured to said container, and having an intake opening communicating with said container; a funnel, movable within said body portion with an air-passing clearance, and having a spiral engagement with said body portion adapted to axially advance said funnel when rotated, defining a measuring cavity of variable capacity, and having an outlet opening; a slidable plunger, adapted to selectively open said intake opening and close simultaneously said outlet opening, or to close both said openings, or to close said intake opening and open said outlet opening; a slidable and rotatable cap, adapted to slide said plunger axially and rotate said funnel when similarly moved; an air-chamber having its volume variable by the sliding of said cap, and being adapted to force air into said measuring cavity when said outlet opening is open; a resilient gasket adapted to prevent the passage of air from said cavity into said air-chamber.

3. In a dispenser for granular material the combination comprising; a measuring cavity of variable capacity, adapted to be filled and discharged by gravity; an axially slidable plunger adapted to control said filling and discharging; a contractible air-chamber adapted to force air into said measuring cavity; an operating element adapted to perform the following functions: to regulate the capacity of said measuring cavity by its rotation, to control the discharge of the granular material from said cavity and the flow of air into said cavity, by its straight motion.

4. In a dispenser for granular material the combination comprising; a measuring cavity of variable volume, regulated by the rotation of an external operating element; a plunger adapted to control the filling and discharging of said measuring cavity and being operable by the straight motion of the said operating element; an air-chamber, the volume of which being variable by the straight motion of the said operating element, said air-chamber being adapted to force air into said cavity during the discharging of the granular material from said cavity.

References Cited in the file of this patent

UNITED STATES PATENTS

| 156,809 | Mefford | Nov. 10, 1874 |
| 1,305,476 | McCord | June 3, 1919 |
| 2,128,718 | Strand et al. | Aug. 30, 1938 |
| 2,603,397 | Olson | July 15, 1952 |